UNITED STATES PATENT OFFICE.

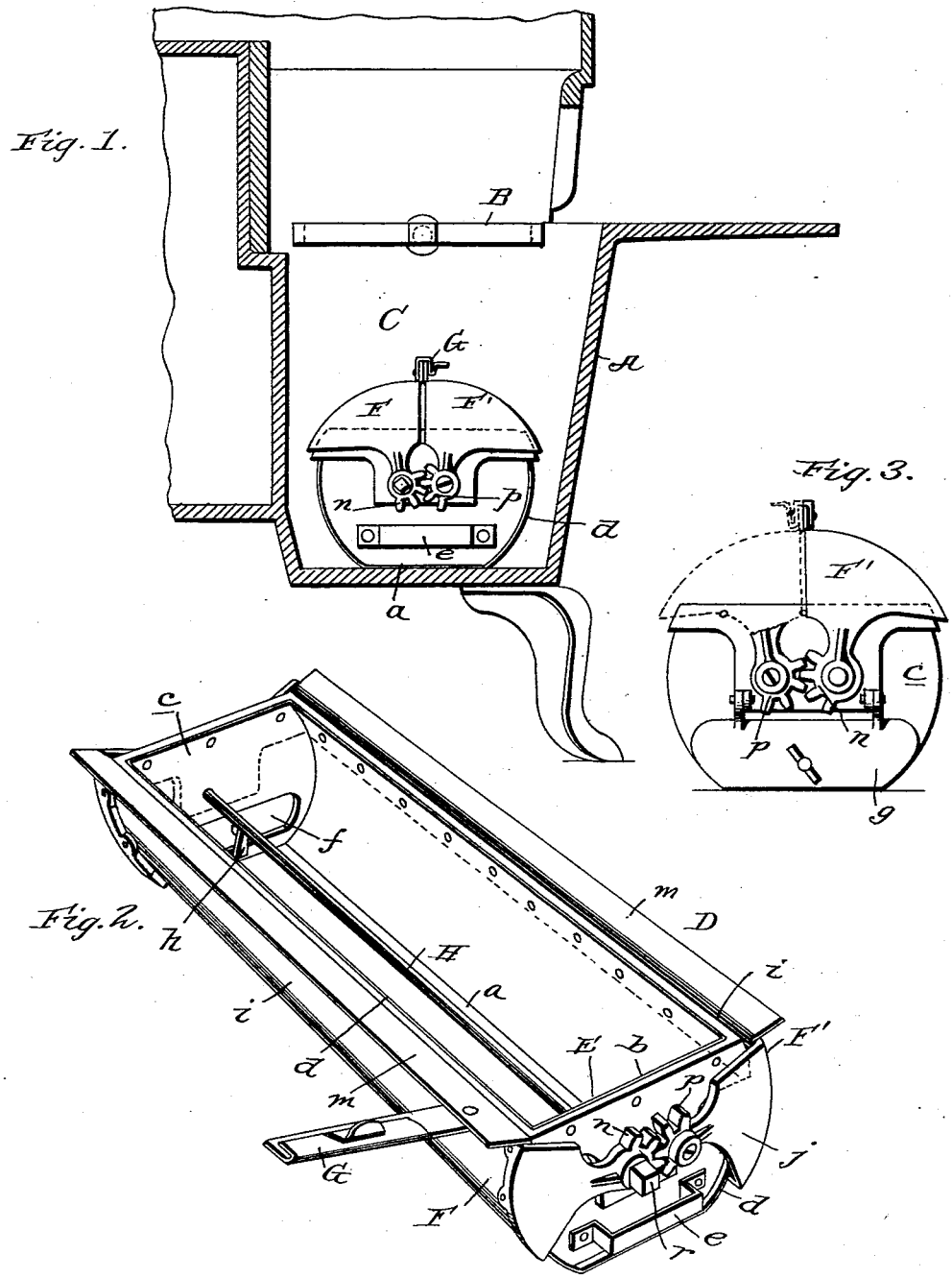

MAX M. KOCH, OF CLEVELAND, OHIO.

ASH PAN OR RECEPTACLE.

SPECIFICATION forming part of Letters Patent No. 564,754, dated July 28, 1896.

Application filed January 4, 1896. Serial No. 574,329. (No model.)

*To all whom it may concern:*

Be it known that I, MAX M. KOCH, a citizen of the United States, residing at Cleveland, in the county of Cuyahoga and State of Ohio, have invented certain new and useful Improvements in Ash Pans or Receptacles; and I do declare the following to be a full, clear, and exact description of the invention, such as will enable others skilled in the art to which it appertains to make and use the same.

My invention relates to improvements in ash pans or receptacles designed for use in stoves, ranges, and furnaces, and, like the invention disclosed in my application of even date herewith, Serial No. 574,330, it has for its general object to provide an ash pan or receptacle having a permanently-connected cover which may be conveniently opened after the pan is placed in the ash-pit of a stove and may as conveniently be closed before the pan is drawn from the said pit, so as to prevent the ashes from flying out of the pan and soiling the person and clothes of the attendant, as well as the apartment, when the pan is removed to the place where the ashes are dumped.

Another object of the invention is to provide an ash-pan which is so constructed that it may be discharged of its contents without giving rise to a cloud of dust.

Other objects and advantages of the invention will be fully understood from the following description and claims, when taken in conjunction with the annexed drawings, in which—

Figure 1 is a view illustrating a portion of a stove in section and my improved receptacle in the ash-pit thereof, said receptacle being shown as closed. Fig. 2 is an enlarged perspective view of the receptacle, the same being illustrated with the cover-sections in their open position; and Fig. 3 is an elevation, partly broken away, of the end of the receptacle opposite to that shown in Fig. 1.

In the said drawings similar letters designate corresponding parts in all of the views, referring to which—

A indicates an ordinary stove having a grate B, and an ash-pit C beneath the grate, and D indicates my improved ash pan or receptacle, which is designed to be placed in and removed from the ash-pit C through a suitable door-opening, (not illustrated,) and comprises a body E and cover-sections F F', permanently connected with the said body.

The body E of the ash pan or receptacle, which is preferably elongated, as shown, in conformity to the ash-pits of ordinary stoves, comprises a suitable bottom wall $a$, front and rear end walls $b$ $c$, and side walls $d$, and it has the said side walls $d$ curved so as to describe a part of a circle, as illustrated, for a purpose presently to be described. The said body E also has connected to the front end wall $b$ a suitable handle $e$, by which it may be conveniently placed in and removed from the ash-pit and carried, and in the rear end wall $c$ it is provided with a suitable discharge-opening $f$. (Better illustrated in Fig. 2.) This discharge-opening $f$ is arranged adjacent to the bottom of the pan or receptacle for obvious reasons, and it is designed to be closed by a door $g$, which may be of any suitable kind and construction and may be secured in its closed position by any suitable means. I prefer, however, to connect the door $g$ in hinged manner with the end wall $c$ above the opening $f$, so as to permit it to swing open when the pan or receptacle is held with the wall $c$ down, and I also prefer to secure said door in its closed position by a suitable fastener $h$, which is designed in one position to engage a keeper on or forming part of the body E.

The cover-sections F F' of the pan or receptacle comprise longitudinal walls $i$, which are curved in the direction of their width to conform to the curvature of the side walls $d$ of the body and end walls or flanges $j$, which rest against and parallel with the end walls of the body, as illustrated. These end walls or flanges $j$ are connected with the end walls of the body E in any suitable hinged or pivotal manner that will permit of the cover-sections being brought together over the body E, so as to close the pan or receptacle, and said cover-sections are preferably provided upon their upper edges with flanges $m$, as shown, which are designed for the engagement of the fastening device G, which is pivotally connected to one of the flanges and is designed to straddle the two flanges, as illustrated, so as to hold the cover-sections together. Means other than the flanges m and fastening device G may, when desired, be employed for connecting the sections when in their closed position.

The end walls or flanges of the cover-section are, as before stated, connected with the body E in a hinged or pivotal manner, and it is desirable to connect them so that they may move in concert. This may be done in any suitable manner, but I prefer to accomplish it by providing the end walls of the cover-sections at one or both ends of the receptacle, preferably at both ends, with intermeshed gears n p, as illustrated. I also prefer, in order to obtain evenness of movement, to fix the gears n of the cover-section F on a rod H, which is journaled in the end walls b c of the body, as illustrated. I also prefer to square the forward end of the rod H, as indicated by r, to receive a suitable wrench for turning the rod and closing the receptacle, although a crank or other device connected to the rod or to one of the gears may be employed for this purpose.

In using my improved ash pan or receptacle it is placed in the ash-pit of a stove while the cover-sections are in their closed position, and the fastening device G is then raised, so as to permit the cover-sections to fall open, which they will do by reason of gravity. When said cover-sections are in their open position, it will be seen that the width of the pan or receptacle is not materially increased, which is an important advantage, as it admits of the receptacle being placed and opened in ash-pits of the ordinary size; and it will also be seen that when the cover-sections are open their flanges will serve to prevent ashes from falling between the receptacle and the walls of the ash-pit and will deflect the ashes into the receptacle.

When the receptacle is filled with ashes and it is desired to remove it, it is simply necessary for the attendant to turn the rod H with a wrench applied to the square end thereof and then fasten the flanges m together with the device G. The receptacle is then thoroughly closed and may be removed to the dump without the ashes flying about, which is a desideratum. When the dump is reached, it is simply necessary for the operator to open the door g, when the ashes will be discharged from the receptacle, and this without making a cloud of dust. When the door g is closed, the receptacle is ready to be carried back to and placed in the stove.

It will be observed that my improved receptacle may be thoroughly closed while it is in the stove and while it is being carried to and from the same, and that therefore ashes may be removed from the stove without getting ashes and dust upon the furniture and floor of the apartment in which the stove is situated and without soiling the person and clothes of the party who removes the ashes.

Having described my invention, what I claim is—

1. An ash pan or receptacle having hinged or pivoted covers for its top and also having a door-opening in one of its end walls, and a door for said opening, whereby the contents may be discharged through the end opening when the covers for the top are closed, substantially as specified.

2. An ash pan or receptacle comprising a body having curved side walls, cover-sections connected with the body in a hinged or pivotal manner and having longitudinal walls curved in conformity to the side walls of the body and provided with flanges at their upper edges, and the device G, pivotally connected to one of the flanges and shaped so as to enable it to straddle the flanges and hold them together, substantially as specified.

3. An ash pan or receptacle comprising a body, a cover-section having end walls connected in a pivotal or hinged manner with the body and provided with gears, a rod journaled in the end walls of the body, and extending the full length thereof and a second cover-section having end walls fixed on the rod and provided with gears which mesh with the gears of the other cover-section, the said rod being adapted to be rocked to open and close the cover-sections, substantially as and for the purpose set forth.

4. An ash pan or receptacle comprising a body having curved side walls and also having an opening in one of its end walls, a door for normally closing said opening, cover-sections connected with the body in a hinged or pivotal manner and having longitudinal walls curved in conformity to the side walls of the body and provided with flanges at their upper edge, and a fastening device connected with one of the cover-sections and adapted to hold the said flanges together and thereby hold the cover-sections in their closed position, substantially as and for the purpose specified.

5. The ash-pan described comprising the body having a flat bottom, straight end walls, and curved side walls, a cover-section having a longitudinal wall curved in conformity to the side wall of the body, and straight end walls connected in a pivotal or hinged manner with the end walls of the body and provided with gears, a rod journaled in the end walls of the body and extending the full length thereof and having one of its ends squared, and a second cover-section having straight end walls fixed on the rod and provided with gears which mesh with the gears of the other cover-section, and a longitudinal wall, curved in conformity to the adjacent side wall of the body, substantially as specified.

In testimony whereof I affix my signature in presence of two witnesses.

MAX M. KOCH.

Witnesses:
L. ERBEN,
P. KNAPPENBERGER.